(12) United States Patent
Fu et al.

(10) Patent No.: US 11,970,620 B2
(45) Date of Patent: Apr. 30, 2024

(54) METHOD FOR PREPARING HIGH SENSITIVITY TEMPERATURE SENSITIVE REVERSIBLE COLOR-CHANGING MICROCAPSULE

(71) Applicant: Jiangnan University, Wuxi (CN)

(72) Inventors: Shaohai Fu, Wuxi (CN); Liping Zhang, Wuxi (CN); Jingjing Li, Wuxi (CN); Chengcheng Wang, Wuxi (CN); Xiaojun Jiang, Wuxi (CN)

(73) Assignee: JIANGNAN UNIVERSITY, Wuxi (CN)

( * ) Notice: Subject to any disclaimer, the term of this patent is extended or adjusted under 35 U.S.C. 154(b) by 75 days.

(21) Appl. No.: 17/896,220

(22) Filed: Aug. 26, 2022

(65) Prior Publication Data

US 2023/0015116 A1    Jan. 19, 2023

Related U.S. Application Data

(63) Continuation of application No. PCT/CN2022/091956, filed on May 10, 2022.

(30) Foreign Application Priority Data

Jun. 9, 2021 (CN) .......................... 202110640936.0

(51) Int. Cl.
   *C09B 11/00* (2006.01)
   *B01J 13/12* (2006.01)
   (Continued)

(52) U.S. Cl.
   CPC ............. *C09B 11/24* (2013.01); *B01J 13/125* (2013.01); *C09B 67/0097* (2013.01)

(58) Field of Classification Search
   CPC ..... C09B 11/24; C09B 67/0097; C09B 57/00; B01J 13/125; B01J 13/02; C07D 493/10
   (Continued)

(56) References Cited

U.S. PATENT DOCUMENTS 5,773,236 A * 6/1998 Diwu .................... C07C 233/78
                                                          549/228

FOREIGN PATENT DOCUMENTS

| CN | 1664014 A | 9/2005 |
| CN | 106632386 A | 5/2017 |

(Continued)

OTHER PUBLICATIONS

STIC Search Report dated Dec. 20, 2023.*

*Primary Examiner* — Eisa B Elhilo
(74) *Attorney, Agent, or Firm* — IPRO, PLLC (57) ABSTRACT

The disclosure belongs to the technical field of material science, and particularly relates to a method for preparing a high sensitivity temperature sensitive reversible color-changing microcapsule. According to the method, a series of novel fluorane dyes are designed and synthesized, the color-changing performance can be achieved without a color developing agent, the fluorane dyes are compounded with a phase change material according to a certain proportion, a series of two-component reversible temperature sensitive color-changing dyes are prepared, and then a two-component reversible thermochromic microcapsule with good color performance and color-changing response performance is prepared by adopting a solvent evaporation method. The two-component reversible thermochromic microcapsule provided by the disclosure can effectively alleviate the color lag phenomenon of a traditional three-component thermochromic capsule.

13 Claims, 2 Drawing Sheets

(51) Int. Cl.
 *C09B 11/24* (2006.01)
 *C09B 67/02* (2006.01)
(58) Field of Classification Search
 USPC .............................................. 8/526
 See application file for complete search history.

(56) References Cited

FOREIGN PATENT DOCUMENTS

| | | | |
|---|---|---|---|
| CN | 108796407 | A | 11/2018 |
| CN | 113416200 | A | 9/2021 |
| CN | 113429420 | A | 9/2021 |
| WO | 9509170 | A1 | 4/1995 |

* cited by examiner

METHOD FOR PREPARING HIGH SENSITIVITY TEMPERATURE SENSITIVE REVERSIBLE COLOR-CHANGING MICROCAPSULE

TECHNICAL FIELD

The disclosure belongs to the technical field of material science, and particularly relates to a method for preparing a temperature sensitive reversible color-changing dye and microcapsule.

BACKGROUND

The thermochromic materials are divided into irreversible thermochromic materials and reversible thermochromic materials. The irreversible thermochromism refers to the color change mainly caused by thermal decomposition, sublimation, fusion, combination reaction and redox reaction of the materials, only one-way color change is achieved, and the practical application is limited. The color change of inorganic reversible thermochromic materials is mainly caused by crystal structure transformation, crystal water gain and loss, electron transfer and ligand geometric configuration change, the color-changing difference of these materials is small, the color-changing temperature is difficult to control, and therefore, the application is limited to a certain extent. Organic thermochromic materials include high polymer materials and small molecule materials. The typical example of the high polymer organic reversible thermochromic materials is included in polydiacetylene, and the color changes from blue to red under temperature stimulation. The small molecule reversible thermochromic materials refer to three-component reversible thermochromic dyes mainly composed of electron donors (leuco dyes), electron acceptors (color developing agent bisphenol A) and phase change solvents, and electronic gain and loss are controlled through the temperature, so that the color change is achieved. At present, these thermochromic dyes are colorful in color, simple in preparation, and controllable in temperature control, thereby having a wide application range.

In the traditional three-component temperature sensitive color-changing dyes, the leuco dyes generally include triarylmethane dyes, fluorane dyes and spiropyran dyes, and these dyes need to be treated with a color developing agent to develop their colors. For example, in CN106810927A, the triarylmethane dyes, color developing agents and phase change material solvents are selected to prepare a reversible thermochromic coating suitable for fabrics. Yang Shuhui et al. prepared the reversible thermochromic materials with the color-changing temperature of 36.0-39.5° C., 44.5-46.5° C. and 51.0-53.5° C. respectively by using tetradecanol, hexadecanol, octadecanol as solvents and a heat-sensitive scarlet of a lactone type compound as a leuco dye, and adding certain color developing agents.

Although these thermochromic materials have been widely researched and applied, the color lag phenomenon still exists in the process of color change (that is, the color change lags behind the temperature change in the cooling process), and it limits the application and development of these dyes in high sensitivity and rapid response.

SUMMARY

The disclosure aims to design and synthesize a series of novel fluorane dyes, and the color-changing performance can be achieved without a color developing agent. The fluorane dyes are compounded with a phase change material according to a certain proportion, a series of two-component reversible temperature sensitive color-changing dyes are prepared, and then a two-component reversible thermochromic microcapsule with good color performance and color-changing response performance is prepared by adopting a solvent evaporation method.

The Technical Solution of the Disclosure

A first objective of the disclosure is to provide a fluorane dye, and the molecular structure of the fluorane dye is as follows:

wherein an $R_1$ group is one of $CH_3$, H and $N(CH_2CH_3)_2$, and an $R_2$ group is one of Cl and H.

A second objective of the disclosure is to provide a method for preparing a two-component temperature sensitive reversible color-changing dye compound, the fluorane dye and a phase change material are heated to the temperature above the melting point of the phase change material and are uniformly mixed, and the two-component temperature sensitive reversible color-changing dye compound is obtained.

Furthermore, the phase change material is at least one of dodecanol, tetradecanol, hexadecanol, octadecanol, decanoic acid, dodecanoic acid, tetradecanoic acid, hexadecanoic acid, octadecanoic acid, diphenyl carbonate, phenyl salicylate, benzyl benzoate, benzyl cinnamate, methyl benzyl stearate, n-pentadecyl acetate, n-tridecyl ester, distearin, monostearin, tristearin and n-amyl laurate.

Furthermore, the mass ratio of the fluorane dye to the phase change material is 1/10 to 1/400.

A third objective of the disclosure is to provide the two-component temperature sensitive reversible color-changing dye compound prepared by using the method for preparing a two-component temperature sensitive reversible color-changing dye compound.

A fourth objective of the disclosure is to provide a method for preparing a temperature sensitive reversible color-changing microcapsule, the two-component temperature sensitive reversible color-changing dye compound and a wall material are used as raw materials, and the temperature sensitive reversible color-changing microcapsule is prepared by adopting a solvent evaporation method.

Specifically, the method for preparing a temperature sensitive reversible color-changing microcapsule includes the following steps: dissolving the two-component temperature sensitive reversible color-changing dye compound and the wall material in a solvent, then adding an emulsifying agent water solution, and fully mixing to form an O/W emulsion; and heating and stirring the O/W emulsion, so that the solvent is completely evaporated, and then filtering, cleaning and drying to obtain the temperature sensitive reversible color-changing microcapsule.

Furthermore, the wall material is one of or a mixture of more of polymethyl methacrylate, polystyrene, polyethyl methacrylate and poly-n-butyl methacrylate.

Furthermore, an emulsifying agent in the emulsifying agent water solution is at least one of gelatin, OP-10, span 20, span 40, span 80, tween 20, tween 40, tween 80, acacia gum and sodium dodecyl benzene sulfonate.

A fifth objective of the disclosure is to provide the temperature sensitive reversible color-changing microcapsule prepared by using the method for preparing a temperature sensitive reversible color-changing microcapsule.

The Beneficial Effects of the Disclosure (1) The disclosure creates a novel fluorane dye with a specific molecular structure, and the two-component temperature sensitive reversible color-changing dye and the microcapsule thereof which are prepared on the basis of the novel fluorane dye can realize the temperature sensitive reversible color change from colored to colored without any background color (no color developing agent is needed). The disclosure provides the two-component temperature sensitive reversible color-changing dye compound and the microcapsule thereof by creating and designing the fluorane dye structure and utilizing the structural characteristics of molecules of the novel fluorane dye to achieve the temperature sensitive color change, the technical bias that the temperature sensitive color-changing dye based on the fluorane dye needs to adopt a three-component formula of the fluorane dye (leuco dye), the color developing agent and the phase change material in the prior art (that is, these dyes need to be treated with the color developing agent to develop their colors) is overcome, and the temperature sensitive reversible color-changing performance equivalent or even superior to that of the temperature sensitive microcapsule adopting the three-component formula is achieved.

(2) The temperature sensitive reversible color-changing microcapsule prepared on the basis of the novel fluorane dye provided by the disclosure can effectively alleviate the color lag phenomenon (the color change lags behind the temperature change in the cooling process) of a traditional three-component thermochromic capsule, specifically, the color lag is less than 1.5° C. in the cooling process, and it indicates that the color-changing response performance of the temperature sensitive reversible color-changing microcapsule provided by the disclosure is excellent.

(3) A series of temperature sensitive reversible color-changing microcapsules with different color changes and different color-changing temperatures can be prepared from the novel fluorane dye obtained on the basis of different $R_1$ and $R_2$ substituent groups, which indicates that the color performance of the temperature sensitive reversible color-changing microcapsule provided by the disclosure is good, and the use demand of people on multi-color change and multistage color-changing temperature of textiles can be met.

DETAILED DESCRIPTION

The outstanding advantages and obvious characteristics of the disclosure are further described with reference to examples, but the disclosure is not only limited to the examples.

The molecular structure of the fluorane dye involved in the examples and comparative examples of the disclosure is as follows (the R group and color development in the molecular structure of the novel fluorane dye are shown in Table 1):

TABLE 1

R Group and Color Development in Molecular Structure of Novel Fluorane Dye

| No. | R$_1$ | R$_2$ | Color Development |
|---|---|---|---|
| 1 | CH$_3$ | phenyl-NH$_2$ | Black |
| 2 | H | phenyl-NH$_2$ | Green |
| 3 | H | 3-(F$_3$C)-phenyl-NH$_2$ | Black |
| 4 | H | 2-Cl-phenyl-NH$_2$ | Black |
| 5 | CH$_3$ | Cl | Scarlet |
| 6 | N(CH$_2$CH$_3$)$_2$ | H | Purple Red |

TABLE 2

Traditional Fluorane Dye Structure

| No. | Dye Structure |
|---|---|
| 7 | [structure of traditional fluorane dye with diethylamino group] |

TABLE 3

Fluorane Dye B Structure

| No. | Dye Structure |
|---|---|
| 8 | [structure of fluorane dye B with diethylamino group, R$_1$, R$_2$ and benzamide substituent] |

Example 1

Preparation of a No. 6 novel fluorane dye: 50 mmol of 3-(diethylamino) phenol and 25 mmol of 3-nitrophthalic anhydride were added to a three-necked flask containing 50 ml of chlorobenzene, being completely dissolved, and then 25 mmol of trifluoromethane sulfonic acid was added. Then the three-necked flask was put into an oil bath pan at 135° C. to be preheated. The nitrogen reflux reaction was carried out for 2 days. After the reaction was completed, cooling to the room temperature was carried out. A solvent was removed by adopting a rotary evaporation method. Dichloromethane (DCM)/methanol was used as an eluent for column chromatography to obtain purple red powder, i.e. a product of ph-NO$_2$.

1 mmol of ph-NO$_2$, 20 mg of Pd/C and 4 ml of ethyl acetate (EtOAc) were put into a three-necked flask. 1.5 mmol of H$_3$PO$_2$ and 4.5 mmol of NaH$_2$PO$_2$H$_2$O were poured into the three-necked flask after being uniformly dissolved in 4 mL of H$_2$O. Then the three-necked flask was put into the oil bath pan at 85° C. to react for 5 h. After cooling to the room temperature, extraction with dichloromethane was carried out. An extracted product was dried in anhydrous sodium sulfate. Then petroleum ether/ethyl acetate/triethylamine was used as an eluent for column chromatography to obtain pink powder, i.e. a product of ph-NH$_2$.

2 mmol of ph-NH$_2$ and 3 mmol of triethylamine were dissolved in 10 mL of DCM. 12 mmol of phenylacetyl chloride was slowly added dropwise in an ice-water bath to react at room temperature for 2 h. The solvent was removed by adopting the rotary evaporation method. The petroleum ether/ethyl acetate/triethylamine was used as an eluent for column chromatography to obtain light pink powder, i.e. a final product of a red No. 3 novel fluorane dye.

Figure 1:
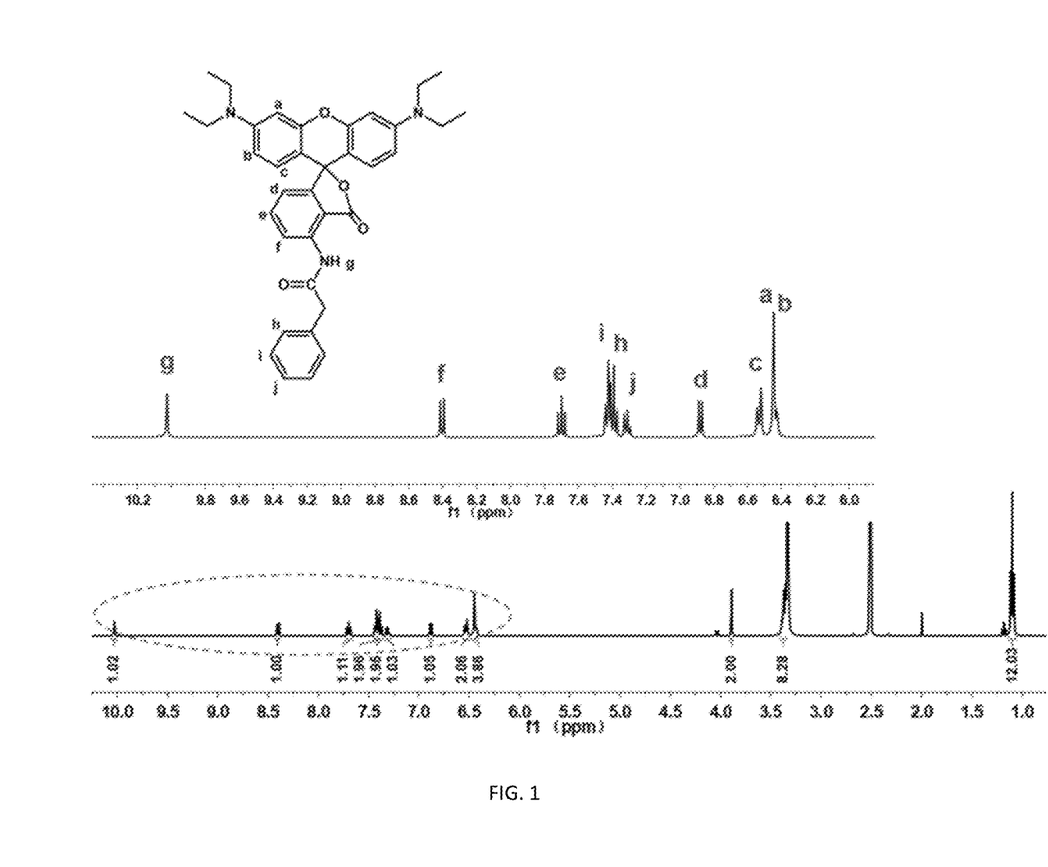
FIG. 1 shows the characterization test results of a red No. 3 novel fluorane dye of the example 1 of the disclosure.

The characterization test results of the red No. 3 novel fluorane dye were shown in FIG. 1: 1H NMR (400 MHz, DMSO-d6) δ 10.03 (s, 1H, NH), 8.40 (d, J=8.2 Hz, 1H), 7.70 (t, J=7.9 Hz, 1H), 7.42 (t, J=6.2 Hz, 2H), 7.38 (d, J=7.7 Hz, 2H), 7.31 (t, J=7.1 Hz, 1H), 6.88 (d, J=7.5 Hz, 1H), 6.53 (d, J=9.2 Hz, 2H), 6.44 (d, J=7.7 Hz, 4H), 3.89 (s, 2H, Ar—

CH2), 3.36 (q, J=6.86 Hz, 8H), 1.10 (t, J=7.0 Hz, 12H). Melting point: 271.2° C. to 271.7° C.

Preparation of a purple red two-component temperature sensitive reversible color-changing dye compound: The No. 6 novel fluorane dye (0.1 g) and 15 g of diphenyl carbonate were magnetically stirred at 85° C. for 1 h to obtain the uniformly mixed two-component temperature sensitive reversible color-changing dye compound.

Preparation of a purple red two-component temperature sensitive reversible color-changing microcapsule: 1.5 g of two-component temperature sensitive reversible color-changing dye compound and 0.75 g of polymethyl methacrylate were dissolved in 5 mL of dichloromethane (DCM). Then an emulsifying agent water solution (2% of 1.0 g of gelatin was mixed with 49 mL of water) was added and stirred at room temperature and 5000 r/min for 20 min to form an O/W emulsion. The O/W emulsion was poured into a beaker and stirred at 35° C. and 400 r/min for 8 h till the DCM was completely evaporated. After deionized water was added for standing, a supernate was poured out, floating objects were removed, and filtering was carried out. Cleaning with deionized water and ethanol was carried out to obtain a product of the purple red two-component temperature sensitive reversible color-changing dye microcapsule.

The purple red two-component temperature sensitive reversible color-changing dye microcapsule was purple red at room temperature and became light pink when being heated to 80° C.

Comparative Example 1-1

Obtaining of a No. 7 traditional fluorane dye: The No. 7 traditional fluorane dye was purchased from Haishan Technology Co., Ltd.

Preparation of a two-component dye compound based on the traditional fluorane dye: The No. 7 traditional fluorane dye (0.1 g) and 15 g of diphenyl carbonate were magnetically stirred at 85° C. for 1 h to obtain the uniformly mixed two-component dye compound based on the traditional fluorane dye.

Preparation of a two-component dye microcapsule based on the traditional fluorane dye: 1.5 g of two-component dye compound based on the traditional fluorane dye and 0.75 g of polymethyl methacrylate were dissolved in 5 mL of dichloromethane (DCM). Then an emulsifying agent water solution (2% of 1.0 g of gelatin was mixed with 49 mL of water) was added and stirred at room temperature and 5000 r/min for 20 min to form an O/W emulsion. The O/W emulsion was poured into a beaker and stirred at 35° C. and 400 r/min for 8 h till the DCM was completely evaporated. After deionized water was added for standing, a supernate was poured out, floating objects were removed, and filtering was carried out. Cleaning with deionized water and ethanol was carried out to obtain a product of the two-component dye microcapsule based on the traditional fluorane dye.

The two-component dye microcapsule based on the traditional fluorane dye was colorless at room temperature and was still colorless when being heated to 80° C. Results proved that the traditional fluorane dye had no temperature sensitive color-changing performance without a color developing agent.

Comparative Example 1-2

The comparative example 1-2 adopted the same No. 7 traditional fluorane dye as the comparative example 1-1.

Preparation of a three-component dye compound based on the traditional fluorane dye: The No. 7 traditional fluorane dye (0.1 g), 15 g of diphenyl carbonate and 0.9 g of bisphenol A (color developing agent) were magnetically stirred at 85° C. for 1 h to obtain the uniformly mixed three-component dye compound based on the traditional fluorane dye.

Preparation of a three-component dye microcapsule based on the traditional fluorane dye: 1.5 g of three-component temperature sensitive reversible color-changing dye compound and 0.75 g of polymethyl methacrylate were dissolved in 5 mL of dichloromethane (DCM). Then an emulsifying agent water solution (2% of 1.0 g of gelatin was mixed with 49 mL of water) was added and stirred at room temperature and 5000 r/min for 20 min to form an O/W emulsion. The O/W emulsion was poured into a beaker and stirred at 35° C. and 400 r/min for 8 h till the DCM was completely evaporated. After deionized water was added for standing, a supernate was poured out, floating objects were removed, and filtering was carried out. Cleaning with deionized water and ethanol was carried out to obtain a product of the three-component dye microcapsule based on the traditional fluorane dye.

The three-component dye microcapsule based on the traditional fluorane dye was red at room temperature and was colorless when being heated to 80° C. Results proved that the traditional fluorane dye had temperature sensitive color-changing performance with a color developing agent.

Comparative Example 1-3

Preparation of a two-component dye compound based on a fluorane dye B: A No. 8 fluorane dye B (0.1 g) and 15 g of diphenyl carbonate were magnetically stirred at 85° C. for 1 h to obtain the uniformly mixed two-component dye compound based on the fluorane dye B.

Preparation of a two-component dye microcapsule based on the fluorane dye B: 1.5 g of two-component dye compound based on the fluorane dye B and 0.75 g of polymethyl methacrylate were dissolved in 5 mL of dichloromethane (DCM). Then an emulsifying agent water solution (2% of 1.0 g of gelatin was mixed with 49 mL of water) was added and stirred at room temperature and 5000 r/min for 20 min to form an O/W emulsion. The O/W emulsion was poured into a beaker and stirred at 35° C. and 400 r/min for 8 h till the DCM was completely evaporated. After deionized water was added for standing, a supernate was poured out, floating objects were removed, and filtering was carried out. Cleaning with deionized water and ethanol was carried out to obtain a product of the two-component dye microcapsule based on the fluorane dye B.

The two-component dye microcapsule based on the fluorane dye B was colorless at room temperature and was still colorless when being heated to 80° C. Results proved that the fluorane dye B had no temperature sensitive color-changing performance without a color developing agent.

Example 2

The example 2 adopted the same No. 6 novel fluorane dye as the example 1.

Preparation of a purple red two-component temperature sensitive reversible color-changing dye compound: The No. 6 novel fluorane dye (0.1 g) and 15 g of hexadecanol were magnetically stirred at 50° C. for 1 h to obtain the uniformly mixed purple red two-component temperature sensitive reversible color-changing dye compound.

Preparation of a purple red two-component temperature sensitive reversible color-changing microcapsule: 1.5 g of purple red two-component temperature sensitive reversible color-changing dye compound and 0.75 g of polymethyl methacrylate were dissolved in 5 mL of dichloromethane (DCM). Then an emulsifying agent water solution (2% of 1.0 g of gelatin was mixed with 49 mL of water) was added and stirred at room temperature and 5000 r/min for 20 min to form an O/W emulsion. The O/W emulsion was poured into a beaker and stirred at 35° C. and 400 r/min for 8 h till the DCM was completely evaporated. After deionized water was added for standing, a supernate was poured out, floating objects were removed, and filtering was carried out. Cleaning with deionized water and ethanol was carried out to obtain a product of the purple red two-component temperature sensitive reversible color-changing microcapsule.

The purple red two-component temperature sensitive reversible color-changing microcapsule was purple red at room temperature and became orange when being heated to 45° C.

Comparative Example 2-1

The comparative example 2-1 adopted the same No. 7 traditional fluorane dye as the comparative example 1-1.

Preparation of a two-component dye compound based on the traditional fluorane dye: The No. 7 traditional fluorane dye (0.1 g) and 15 g of hexadecanol were magnetically stirred at 50° C. for 1 h to obtain the uniformly mixed two-component dye compound based on the traditional fluorane dye.

Preparation of a two-component dye microcapsule based on the traditional fluorane dye: 1.5 g of two-component dye compound based on the traditional fluorane dye and 0.75 g of polymethyl methacrylate were dissolved in 5 mL of dichloromethane (DCM). Then an emulsifying agent water solution (2% of 1.0 g of gelatin was mixed with 49 mL of water) was added and stirred at room temperature and 5000 r/min for 20 min to form an O/W emulsion. The O/W emulsion was poured into a beaker and stirred at 35° C. and 400 r/min for 8 h till the DCM was completely evaporated. After deionized water was added for standing, a supernate was poured out, floating objects were removed, and filtering was carried out. Cleaning with deionized water and ethanol was carried out to obtain a product of the two-component dye microcapsule based on the traditional fluorane dye.

The two-component dye microcapsule based on the traditional fluorane dye was colorless at room temperature and was still colorless when being heated to 45° C. Results proved that the traditional fluorane dye had no temperature sensitive color-changing performance without a color developing agent.

Example 3

Preparation of a No. 2 novel fluorane dye: 3-diethylamino phenol (1.65 g) and 3-nitrophthalic anhydride (2.89 g) were dissolved in methylbenzene (25 ml) and put into a three-necked flask to react at 110° C. for 4 h in an oil bath pan. After cooling to the room temperature, extraction with a small amount of petroleum ether was carried out. A supernate was removed to obtain purple red precipitates. The precipitates were purified by column chromatography. Dichloromethane/methanol was used as an eluent to obtain golden yellow powder, i.e. a product of 4-diethylamino nitryl keto acid.

The 4-diethylamino nitryl keto acid (intermediate M1) (2 g) and concentrated sulfuric acid (15 ml) were put into a three-necked flask to dissolve the powder in an ice-water bath. Then 4-methoxy diphenylamine (1.11 g) was put into the three-necked flask to react at room temperature for 24 h. Then products were slowly added dropwise in ice water to obtain dark green precipitates. The precipitates were washed with water and filtered for several times till the pH was adjusted to be neutral. The precipitates were dried at 30° C. The products were purified by column chromatography. Dichloromethane/methanol was used as an eluent to obtain dark green powder, i.e. a product of 6'-(diethylamino)-4-nitryl 2'-(anilino) fluorane.

An intermediate M2 (1 g), PD/C (0.067 g) and ethyl acetate (8 ml) were put into a three-necked flask to dissolve the powder. Then $H_3PO_2$ (0.781 g) and $NaH_2PO_2H_2O$ (1.882 g) were dissolved in water (6 ml) and put into the three-necked flask to react at 85° C. for 7 h in the oil bath pan. After cooling to the room temperature, extraction with dichloromethane was carried out. An obtained product was dried in anhydrous sodium sulfate. Then petroleum ether/ethyl acetate/triethylamine was used as an eluent for column chromatography to obtain light brown powder, i.e. a product of 4-amino-6'-(diethylamino)-2'-(anilino) fluorane.

An intermediate M3 (1 g) and triethylamine (0.317 g) were put into a three-necked flask to dissolve in tetrahydrofuran (20 ml). Then phenylacetyl chloride/triethylamine (2.023 g/10 ml) was slowly added dropwise in the ice-water bath to react at room temperature for 3 h. A solvent of triethylamine was removed by adopting a rotary evaporation method. A product was subjected to column chromatography. Petroleum ether/ethyl acetate/triethylamine was used as an eluent to obtain light green powder, i.e. a product of 4-phenylacetamide-6'-(diethylamino)-2'-(anilino) fluorane. The No. 2 novel fluorane dye was obtained.

Figure 2:
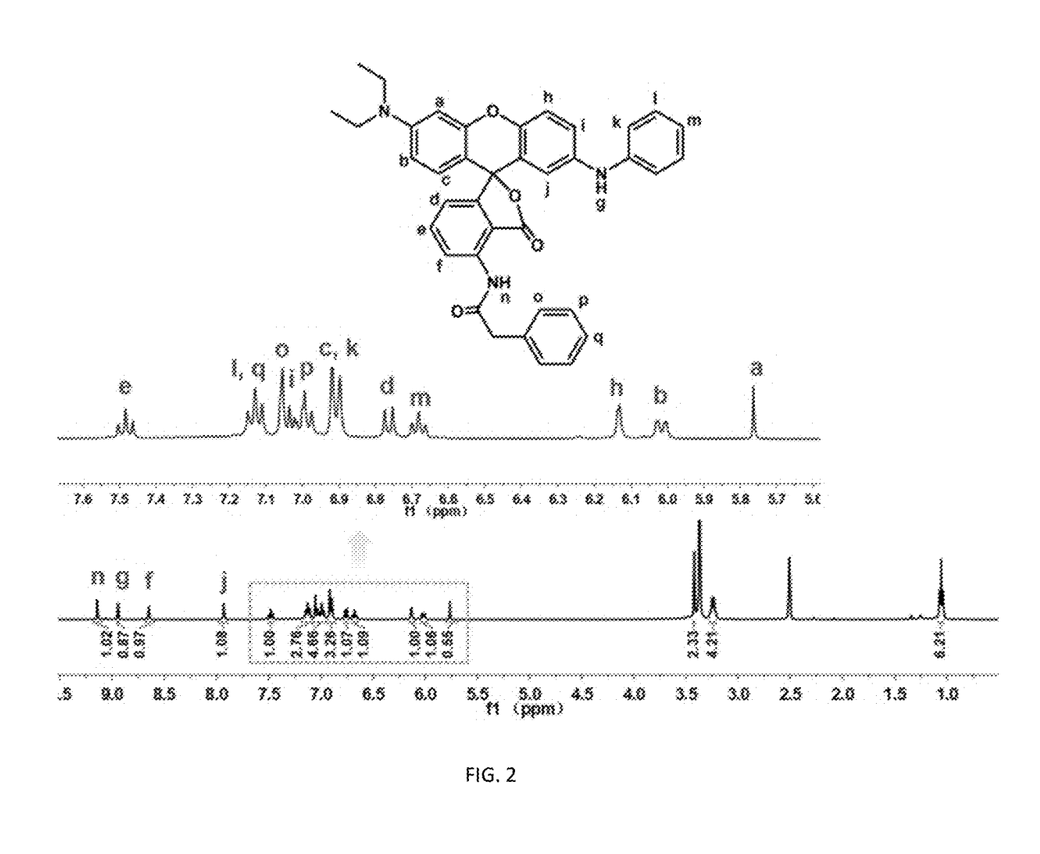
FIG. 2 shows the characterization test results of a No. 2 novel fluorane dye of the example 3 of the disclosure.

The characterization test results of the No. 2 novel fluorane dye were shown in FIG. 2: 1H NMR (400 MHz, DMSO) δ 9.14 (s, H, NH), 8.94 (s, J=1.3 Hz, H, NH), 8.65 (d, 1H), 7.93 (s, 1H), 7.48 (t, J=7.9 Hz, 1H), 7.13 (t, J=7.84 Hz, 3H), 7.01 (m, 5H), 6.91 (d, J=8.49 Hz, 3H), 6.76 (d, J=8.77 Hz, 1H), 6.68 (t, J=7.26 Hz, 1H), 6.13 (d, J=2.2 Hz, 1H), 6.02 (dd, J=8.8, 2.3 Hz, 1H), 5.76 (s, 1H), 3.42 (s, 2H), 3.24 (q, J=6.78 Hz, 4H), 1.05 (t, J=6.93 Hz, 6H). Melting point: 199.4° C. to 201.9° C.

Preparation of a green two-component temperature sensitive reversible color-changing dye compound: The No. 2 novel fluorane dye (0.1 g) and 15 g of diphenyl carbonate were magnetically stirred at 85° C. for 1 h to obtain the uniformly mixed green two-component temperature sensitive reversible color-changing dye compound.

Preparation of a green two-component temperature sensitive reversible color-changing microcapsule: 1.5 g of green two-component temperature sensitive reversible color-changing dye compound and 0.75 g of polymethyl methacrylate were dissolved in 5 mL of dichloromethane (DCM). Then an emulsifying agent water solution (2% of 1.0 g of gelatin was mixed with 49 mL of water) was added and stirred at room temperature and 5000 r/min for 20 min to form an O/W emulsion. The O/W emulsion was poured into a beaker and stirred at 35° C. and 400 r/min for 8 h till the DCM was completely evaporated. After deionized water was added for standing, a supernate was poured out, floating objects were removed, and filtering was carried out. Cleaning with deionized water and ethanol was carried out to obtain a product of the green two-component temperature sensitive reversible color-changing microcapsule.

The green two-component temperature sensitive reversible color-changing microcapsule was green at room temperature and became light yellow when being heated to 80° C.

TABLE 4

Test Results of Temperature Sensitive Color-Changing Performance of Microcapsules

| | Dye No. | Components | Color-Changing Temperature (° C.) | Color Change | Color Lag Phenomenon (° C.) |
|---|---|---|---|---|---|
| Example 1 | 6 | Novel Dye + Diphenyl Carbonate | 80 | Purple Red-Light Pink | <1.5 |
| Comparative Example 1-1 | 7 | Traditional Dye + Diphenyl Carbonate | — | Colorless-Colorless | — |
| Comparative Example 1-2 | 7 | Traditional Dye + Diphenyl Carbonate + Bisphenol A (Color Developing Agent) | 80 | Red-Colorless | 13 |
| Comparative Example 1-3 | 8 | Other Dyes + Diphenyl Carbonate | — | Colorless-Colorless | — |
| Example 2 | 6 | Novel Dye + Hexadecanol | 45 | Purple Red-Orange | <1.5 |
| Comparative Example 2-1 | 7 | Traditional Dye + Hexadecanol | — | Colorless-Colorless | — |
| Example 3 | 2 | Novel Dye + Diphenyl Carbonate | 80 | Green-Light Yellow | <1.5 |

By analyzing Table 4, according to the example 1, the comparative example 1-1 and the comparative example 1-2, it can be seen that the two-component temperature sensitive reversible color-changing dye and the microcapsule thereof which are prepared from the novel fluorane dye provided by the disclosure can realize the temperature sensitive reversible color change from colored to colored without a color developing agent, but the three-component dye microcapsule prepared from the traditional fluorane dye has the temperature sensitive color-changing performance only when the color developing agent is added. The same conclusion is proved by the test results of the example 2 and the comparative example 2-1.

According to the example 1 and the comparative example 1-3, it can be seen that only the two-component temperature sensitive reversible color-changing dye and the microcapsule thereof which are prepared by adopting the fluorane dye with a specific structure provided by the disclosure have the temperature sensitive color-changing performance.

According to the example 1-3 and the comparative example 1-2, it can be seen that the two-component temperature sensitive reversible color-changing dye compound and the microcapsule thereof provided by the disclosure have the temperature sensitive reversible color-changing performance superior to that of the temperature sensitive microcapsule adopting the three-component formula. Specifically, in the cooling process of the two-component temperature sensitive reversible color-changing dye microcapsule provided by the disclosure, the color lag is less than 1.5° C., and it indicates that the color-changing response performance of the temperature sensitive reversible color-changing microcapsule provided by the disclosure is excellent.

The color lag phenomenon (the color change lags behind the temperature change in the cooling process) of the traditional three-component thermochromic capsule can be effectively improved, and the high sensitivity response to the temperature change is achieved.

According to the example 1 and the example 2, it can be seen that the novel fluorane dye is combined with different phase change materials, so that the color-changing temperature and color can be adjusted, which indicates that the color performance of the temperature sensitive reversible color-changing microcapsule provided by the disclosure is good, and the use demand of people on the multistage color-changing temperature of textiles can be met.

According to the example 1 and the example 3, it can be seen that a series of temperature sensitive reversible color-changing microcapsules with different color changes and different color-changing temperatures can be prepared from the novel fluorane dye obtained on the basis of different $R_1$ and $R_2$ substituent groups, which indicates that the color performance of the temperature sensitive reversible color-changing microcapsule provided by the disclosure is good, and the use demand of people on the multi-color change of textiles can be met.

What is claimed is:

1. A method comprising heating a fluorane dye and a phase change material to a temperature above the melting point of the phase change material and uniformly mixing, and obtaining a two-component temperature sensitive reversible color-changing dye compound;

wherein the molecular structure of the flourane dye is as follows:

wherein an $R_1$ group id one of $CH_3$, H and $N(CH_2CH_3)_2$, and an $R_2$ group is one of Cl and H.

2. The method according to claim 1, wherein the phase change material is at least one of dodecanol, tetradecanol, hexadecanol, octadecanol, decanoic acid, dodecanoic acid, tetradecanoic acid, hexadecanoic acid, octadecanoic acid, diphenyl carbonate, phenyl salicylate, benzyl benzoate, benzyl cinnamate, methyl benzyl stearate, n-pentadecyl acetate, n-tridecyl ester, distearin, monostearin, tristearin and n-amyl laurate.

3. The method according to claim 1, wherein the mass ratio of the fluorane dye to the phase change material is 1/10 to 1/400.

4. The method according to claim 2, wherein the mass ratio of the fluorane dye to the phase change material is 1/10 to 1/400.

5. A method ccording to claim 1, further comprising using the two-component temperature sensitive reversible color-changing dye compound and wall material as raw materials, preparing a thermo-sensitive reversible chromotropic microcapsules by solvent evaporation method.

6. The method according to claim 5, wherein the phase change material is at least one of dodecanol, tetradecanol, hexadecanol, octadecanol, decanoic acid, dodecanoic acid, tetradecanoic acid, hexadecanoic acid, octadecanoic acid, diphenyl carbonate, phenyl salicylate, benzyl benzoate, benzyl cinnamate, methyl benzyl stearate, n-pentadecyl acetate, n-tridecyl ester, distearin, monostearin, tristearin and n-amyl laurate.

7. The method according to claim 5, wherein the mass ratio of the fluorane dye to the phase change material is 1/10 to 1/400.

8. The method according to claim 5, comprising the following steps:
dissolving the two-component temperature sensitive reversible color-changing dye compound and the wall material in a solvent, then adding an emulsifying agent water solution, and fully mixing to form an O/W emulsion; and heating and stirring the O/W emulsion, so that the solvent is completely evaporated, and then filtering, cleaning and drying to obtain the thermo-sensitive reversible chromotropic microcapsule.

9. The method according to claim 6, comprising the following steps:
dissolving the two-component temperature sensitive reversible color-changing dye compound and the wall material in a solvent, then adding an emulsifying agent water solution, and fully mixing to form an O/W emulsion; and heating and stirring the O/W emulsion, so that the solvent is completely evaporated, and then filtering, cleaning and drying to obtain the temperature sensitive reversible color-changing microcapsule.

10. The method according to claim 7, comprising the following steps:
dissolving the two-component temperature sensitive reversible color-changing dye compound and the wall material in a solvent, then adding an emulsifying agent water solution, and fully mixing to form an O/W emulsion; and heating and stirring the O/W emulsion, so that the solvent is completely evaporated, and then filtering, cleaning and drying to obtain the temperature sensitive reversible color-changing microcapsule.

11. The method according to claim 5, wherein the wall material is one of or a mixture of more of polymethyl methacrylate, polystyrene, polyethyl methacrylate and poly-n-butyl methacrylate.

12. The method according to claim 6, wherein the wall material is one of or a mixture of more of polymethyl methacrylate, polystyrene, polyethyl methacrylate and poly-n-butyl methacrylate.

13. The method according to claim 7, wherein the wall material is one of or a mixture of more of polymethyl methacrylate, polystyrene, polyethyl methacrylate and poly-n-butyl methacrylate.

* * * * *